L. WOJIDKOW.
CHAFING DISH PAN.
APPLICATION FILED MAY 31, 1912.
1,044,721.
Patented Nov. 19, 1912.
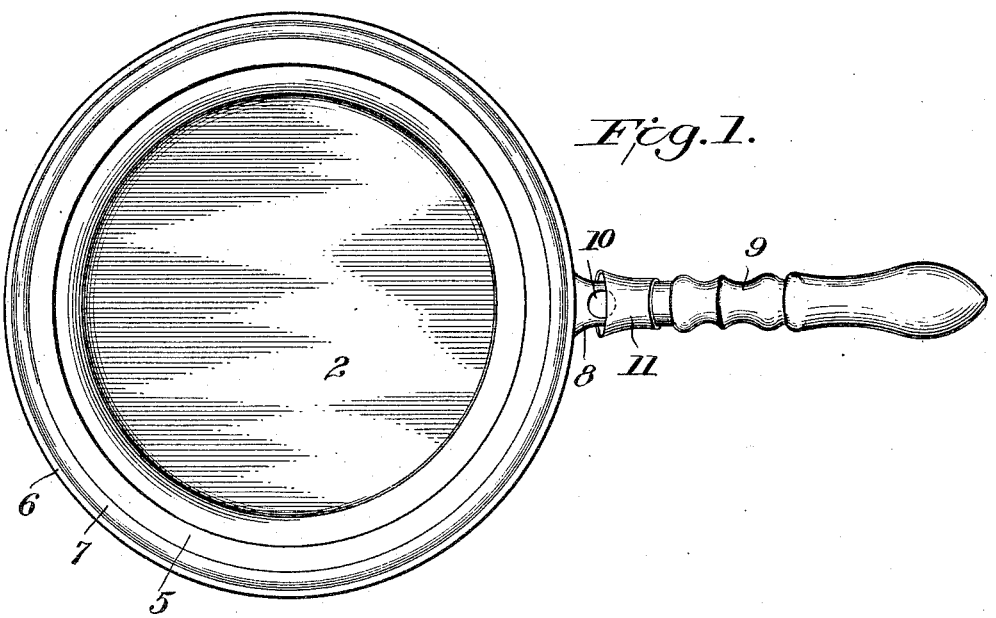
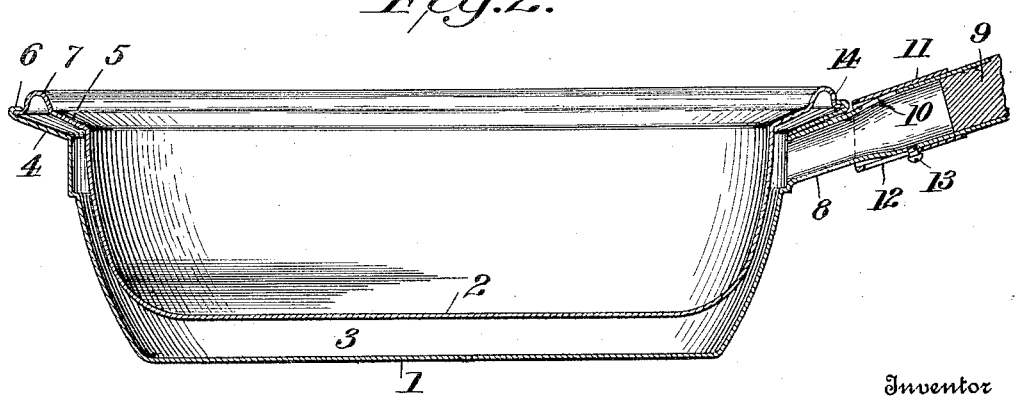
Witnesses
C. N. Walker.
Lillie M. Perry.
Inventor
Louis Wojidkow
by Wm. H. Finnel
Attorney
COLUMBIA PLANOGRAPH CO., WASHINGTON, D. C.

UNITED STATES PATENT OFFICE.

LOUIS WOJIDKOW, OF BROOKLYN, NEW YORK, ASSIGNOR TO NEW YORK STAMPING COMPANY, OF BROOKLYN, NEW YORK, A CORPORATION OF NEW YORK.

CHAFING-DISH PAN.

1,044,721.   Specification of Letters Patent.   Patented Nov. 19, 1912.

Application filed May 31, 1912.   Serial No. 700,870.

*To all whom it may concern:*

Be it known that I, LOUIS WOJIDKOW, a citizen of the United States, residing at Brooklyn, in the county of Kings and State of New York, have invented a certain new and useful Improvement in Chafing-Dish Pans, of which the following is a full, clear, and exact description.

This invention relates more particularly to chafing dish pans, and the object of the invention is to combine in one the heretofore usually separated water-containing pan and the food-containing pan, so that the two pans may be handled simultaneously and one handle dispensed with, and further that the food contained in the food-receiving pan may be kept warm as long as the water in the water-containing pan is hot.

The invention consists of a chafing dish pan composed of two concentric pans, one within the other, with an intervening water space, and a filling and emptying spout made as a part of the handle, all as I will proceed now to explain and finally claim.

In the accompanying drawings, illustrating the invention, in the two figures of which like parts are similarly designated, Figure 1 is a top plan view, and Fig. 2 is a cross-section on a larger scale.

The water-receiving pan 1 may be of any suitable material, as copper or other metal, and the food-receiving pan 2 may be made of aluminum or other suitable metal, and of a size to fit within the pan 1 concentrically and be secured thereto so as to leave a water space 3 co-extensive with the bottoms of the pans and extending up to the top. These two pans may be joined in any usual or approved way, but I prefer to provide a flared flange 4 on the pan 1 and a flared flange 5 on the pan 2, and close down the rim of the flange 4 over the flange 5, as shown at 6.

The pan 2 may be provided with a reinforcing bead 7, which will also serve as a guard for any cover that may be used on the pan.

The water pan is provided with a tubular socket 8 to receive a handle 9, which may be of wood or other non-heat conducting material. This hollow socket 8 opens into the water space 3, and it is provided with a hole 10 by which water may be introduced into the water chamber and poured out from it. The hole is closed by a sliding cover 11 made as a tube to conform to the contour of the socket and the adjacent portion of the pan.

The cover 11 may be secured to the socket by any suitable means permitting of its longitudinal movement to cover and uncover the hole 10, and I have herein shown as such means the slot 12 in the cover and the screw stop 13 in the socket. Obviously, in addition, these means prevent the rotation of the cover on the socket.

A vent hole 14 may be provided in the pan 2 to permit the escape of steam from the water space.

By the construction described, the water-pan and the food-pan which have heretofore ordinarily been separated and each provided with its own handle, are combined and one handle dispensed with. Not only is there this economy, but there are other economies in manufacture, in that only one surface of each of the thus combined pans has to be finished, namely, the outer surface of the water-pan and the outer surface of the food-pan. Furthermore, the food-pan may be made of very light aluminum, although the invention is not limited to the use of any particular material, since, obviously the pans may be of any suitable material; and, for example, the food pan may be of china, porcelain, earthenware, and any other ceramic ware, as well as of metal. Still another advantage is that when the lamp underneath the pan is extinguished, the water in the water-pan will remain hot longer, because the food-pan is never lifted from the water and thus the water is not exposed directly to the outside atmosphere.

What I claim is:—

1. A chafing dish pan, comprising an outer water pan and an inner food-pan, permanently united and having an intervening water space, a tubular handle socket communicating with said water space and having an opening for filling and emptying the water space, and a tubular cover for said opening slidable longitudinally upon said socket.

2. A chafing dish pan, comprising an outer water-pan and an inner food-pan, permanently united and having an intervening water space, a tubular handle socket communicating with said water space and having an opening for filling and emptying the water space, and a tubular cover for said opening slidable upon said socket, and means to limit the movement of said sliding cover and prevent its rotation.

In testimony whereof I have hereunto set my hand this 29th day of May A. D. 1912.

LOUIS WOJIDKOW.

Witnesses:
W. H. FINCKEL, Jr.,
LILLIE M. PERRY.

Copies of this patent may be obtained for five cents each, by addressing the "Commissioner of Patents, Washington, D. C."